Aug. 31, 1948.    N. J. POUX    2,448,192
SLIDER FOR SLIDE FASTENERS
Filed Nov. 2, 1944    2 Sheets-Sheet 1

INVENTOR
NOEL J. POUX
BY R. E. Meech
ATTORNEY.

Aug. 31, 1948.                N. J. POUX                2,448,192
                        SLIDER FOR SLIDE FASTENERS
Filed Nov. 2, 1944                                  2 Sheets-Sheet 2

INVENTOR.
NOEL J. POUX
BY R. E. Meech
ATTORNEY.

Patented Aug. 31, 1948

2,448,192

UNITED STATES PATENT OFFICE 2,448,192

SLIDER FOR SLIDE FASTENERS

Noel J. Poux, Meadville, Pa., assignor to Talon, Inc., a corporation of Pennsylvania Application November 2, 1944, Serial No. 561,513

16 Claims. (Cl. 24—205)

1

This invention relates to sliders for slide fasteners of the well-known type wherein a plurality of spaced interlocking fastener elements attached to the edges of a pair of opposed tapes or stringers are engaged or disengaged by movement of a slider along the elements longitudinally of the stringers.

Such a slider consists generally of a pair of spaced parallel wings or plates connected together at one end by a neck or wedge portion and having inwardly extending marginal guide flanges so as to provide a Y-shaped channel between the wings through which the fastener elements pass for engaging and disengaging the same. It is well known to those skilled in the art that the wings together with the opposed flanges of the slider, must be accurately spaced apart in order that the fastener operate satisfactorily. If the wings are spaced too great a distance apart, the fastener elements will pass between the flanges and consequently, the slider will become displaced from the fastener elements and the fastener is thereby made inoperative. Oftentimes, the slider becomes accidentally displaced from the fastener elements or stringers due to many causes, for instance, material or other foreign elements may get caught between the wings and/or flanges and the fastener elements, thereby spreading the wings sufficiently so that the slider will become removed from the track or fastener elements. Any such occurrence is not only inconvenient and annoying, but the replacement of a conventional slider requires expert knowledge and skill.

Heretofore, various types of removable sliders have been suggested and used to remedy this condition, which can be readily replaced on the track or fastener elements so as to again make the fastener operative, but these sliders have several disadvantages which render their use prohibitive. Most of these sliders employed the use of hinged plates or wings with means for locking the wings in spaced relation after the slider was assembled on the stringer. Such sliders not only consisted of a plurality of intricate parts which were difficult and expensive to manufacture and assemble, but oftentimes, the interlocking means would wear and work loose and permit play between the plates so that they would spread sufficiently to become displaced from the stringers, thereby defeating the primary purpose for which such sliders were intended.

According to my invention, there is provided a slider consisting of two independent wings or plates having interlocking means incorporated

2 therewith for connecting them securely together so as to maintain the wings at all times, in their proper spaced relation, thereby eliminating the above mentioned disadvantages.

Accordingly, it is one of the objects of the present invention to provide an improved slider of the type described, which is simple and inexpensive in its construction and consists of two parts which may be conveniently die-cast, if desired, and easily assembled.

It is another object of this invention to provide an improved slider for slide fasteners which can be readily applied to the fastener stringers at any point therealong whereby the fastener is made quickly repairable and operative.

It is a further object of the present invention to provide a quick repair slider consisting of a minimum number of parts which can be readily applied to the fastener stringers without the necessity of expensive tools or other equipment.

It is a more specific object of this invention to provide a slider consisting of two parts having an interlocking means incorporated therewith which automatically interlocks the two parts when they are forced together.

Various other objects and advantages of this invention will be more apparent in the course of the following specification, and will be particularly pointed out in the appended claims.

In the accompanying drawings, there are shown for the purpose of illustration, one embodiment and several modifications which my invention may assume in practice.

In these drawings:

Fig. 9a is a cross-sectional view of the member shown in Fig. 9;

Figure 1:
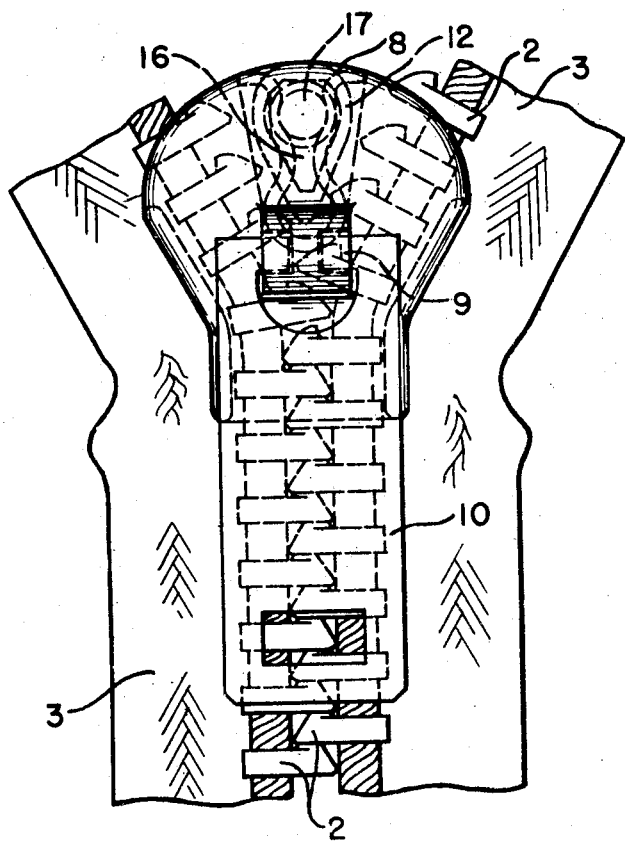
Fig. 1 is a plan view of a slide fastener showing the improved slider of my invention incorporated therewith.
Figure 2:
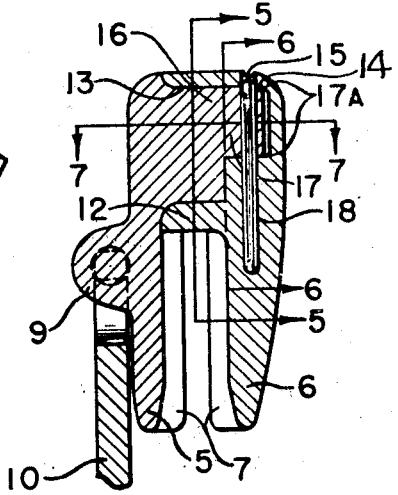
Fig. 2 is a longitudinal sectional view through my improved slider.
Figure 3:
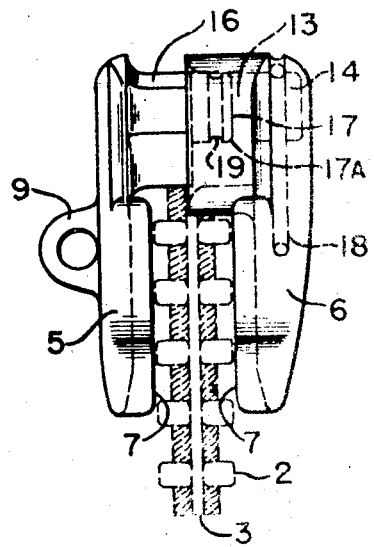
Fig. 3 is a side elevational view of the improved slider of the present invention showing it being assembled on the slide fastener stringers.
Figure 4:
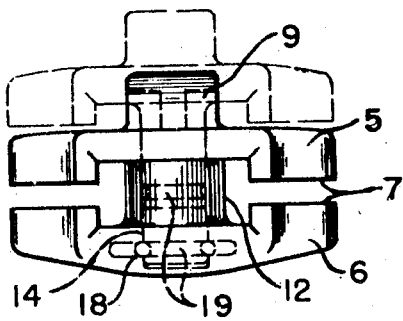
Fig. 4 is an end view of my improved slider after assembly.
Figure 5:
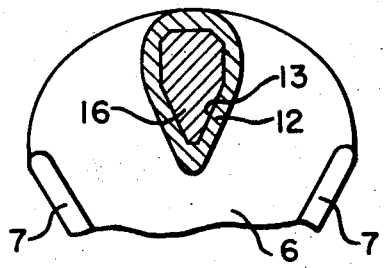
Fig. 5 is a sectional view taken on line 5—5 of Fig. 2.

There is shown in Fig. 1 of the drawings, a conventional type slide fastener comprising a series of spaced apart interlocking fastener elements 2 attached to opposed beaded edges of tapes or stringers 3. There is arranged on the fastener elements, a slider 4 for longitudinal movement therealong in opposite directions to open and close the fastener in a well-known manner. Such a slider consists generally of overlying spaced apart upper and lower wings 5 and 6, respectively, having inwardly extending guide flange portions 7 along their marginal edges and connected at one end thereof by a neck 8, so as to provide a Y-shaped channel between the wings into and through which the fastener elements pass when the slider is moved therealong for engaging and disengaging the same. There is integrally arranged with the top wing of the slider, a lug 9 to which a pull member 10 is pivotally attached for manipulating the slider.

According to the present invention, as more clearly shown in Fig. 2 through 8 of the drawings, the connecting neck 8 comprises an inwardly extending substantially diamond-shaped neck portion 12 arranged integrally with and centrally of the bottom wing 6 at the upper end thereof. Centrally of the neck portion 12, there is arranged therein a polygonal-shaped hole or socket 13 which extends substantially to a point adjacent the plane of the inner wing 6. There is arranged in the wing 6 adjacent the upper end thereof, a cylindrical hole 14 which communicates with the socket 13 in the neck portion 12. There is also arranged in the wing 6, a longitudinally extending recess or opening 15 having its longitudinal dimension extending substantially perpendicular to the axis or longitudinal dimension of the hole 14 and communicating therewith and, if desired, may be open to the upper or outer end of the wing for a purpose hereinafter to be described.

At the upper end of the opposed or top wing 5 there is arranged integral therewith and centrally thereof, a smaller inwardly extending neck portion preferably in the form of a stud-like projecting portion 16 having a polygonal-shaped cross-section conforming to the polygonal-shape of the socket 13 of the wing 6, in which it is disposed. On the extreme outer end of the stud-like portion 16, there is provided a reduced cylindrical stud-like portion 17 which conforms to the cylindrical opening 14 in the wing 6 in which it is disposed. The stud 16 and socket 13 with which it cooperates, are polygonal-shaped so as to act as a key arrangement for preventing rotative movement of the two wings relative to each other.

Figure 6:
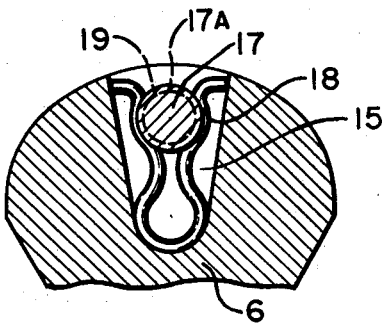
Fig. 6 is a sectional view taken on line 6—6 of Fig. 2.
Figure 7:
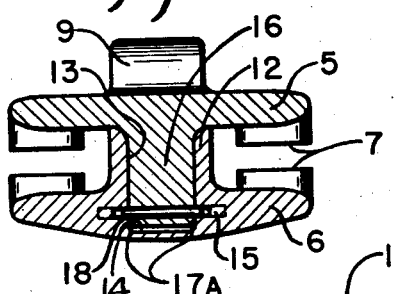
Fig. 7 is a sectional view taken on line 7—7 of Fig. 2.

There is mounted in the recess 15, a yieldable or resilient member 18, preferably in the form of a spring having a lyre or key-hole shape, as shown in Fig. 6 of the drawings. The extreme outer end of the cylindrical stud portion 17 is preferably bevelled as at 17a, so that it will cam the legs of the spring apart when forced therethrough. Around the periphery of the cylindrical stud-like portion 17 there is arranged preferably a circumferential groove 19 with which the yieldable or spring member 18 cooperates to lock the wings together in a manner to be described. The resilient or yieldable member 18 is inserted in the recess 15, preferably from the upper open end of the recess at the top of the wing and is preferably permanently housed in this recess by peening or closing the open end of the recess, so as to prevent the member 18 from becoming displaced therefrom. It will be seen that both of the wing portions 5 and 6 together with the interconnecting portions 12 and 16 carried thereby, are constructed in such a manner that they may be easily and conveniently die cast and it is preferable that these wing portions be of such die cast construction.

The improved slider of my invention is assembled on the fastener elements in the following manner. The lower wing portion 6 is first positioned on the under side of the fastener with the fastener elements disposed in the Y-shaped channel between the guide flanges 7 and the neck portion 12. The top wing 5 is then positioned on the upper side of the fastener elements directly opposite the lower wing 6 with the stud-like portion 16 projecting into the socket 13 of the neck portion 12 of the lower wing. The two wing portions 6 are then moved toward each other and forced together with a pressing action and upon such movement of the wings, it will be seen that the polygonal-shaped stud-like portion 16 passes into the socket 13 and that the cylindrical stud portion 17 passes into the cylindrical hole 14 in the wing 6. Upon continued movement into and through the openings 14, it will be seen that the bevelled end 17a of the cylindrical stud-like portion 17 will be moved into contact with the yieldable or spring member 18, and forced therethrough until the circumferential groove 19 around the stud 17 is disposed in the recess 15 directly opposite the yieldable or resilient member 18 therein, at which time the member 18, due to the resiliency or yieldableness thereof, will fall or snap into position in the groove, thereby securely attaching the two wings together. In other words, the two slider wings 5 and 6 are forced together and the resilient locking member 18 snaps into engagement with the groove 19 in the stud-like portion 17 in a manner similar to the action of a snap fastener. It is desirable that the resilient member 15 be of such construction and possess the required characteristics to maintain the wings 5 and 6 permanently connected at all times, as it is not desirable that they be separated once the slider is assembled in position on the fastener elements. If desired, the stud-like portion 17 may extend all the way through the wing 6 with the opening for the spring being disposed on the outer side of the wing instead of in the body thereof, as shown. It will be understood that the neck portion 12 of the wing 6 is of sufficient height and arranged so as to space the wings 5 and 6 the required distance apart, that is, the outer end of the neck portion 12 abuts the inner side of the wing 5 so as to maintain the wings 5 and 6 a predetermined distance apart.

Figure 9:
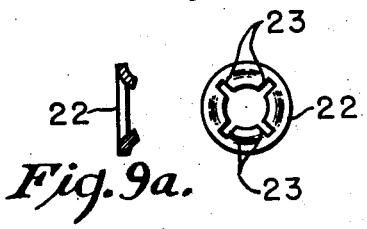
Fig. 9 shows plan and cross-sectional views of a modified form of resilient means that may be used in the form of a split rivet.
Figure 10:
Fig. 10 shows another form of spring that may be used.
Figure 8:
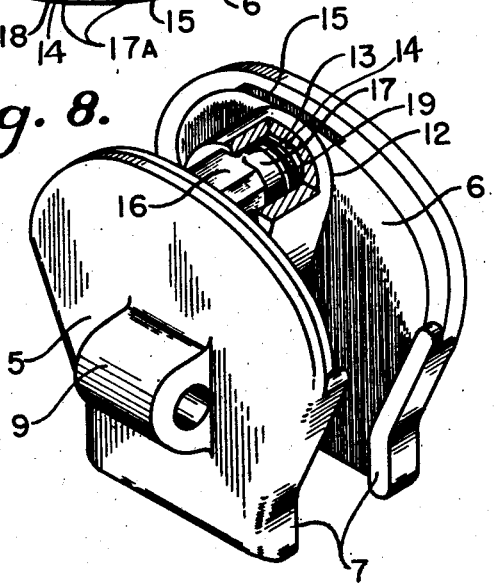
Fig. 8 is an enlarged perspective view partly in section, showing how the two slider wings are assembled.

In Figs. 9 and 10 of the drawings, there are shown other types of spring members 18 that may be used in accordance with the teachings of the present invention. In Fig. 9, there is shown a rivet 22 which is split radially as at 23, through which the stud-like portion 17 is forced when the wings are moved together. Such a rivet would not necessarily have to have resilient characteristics and in such case, the end of the stud-like portion would be forced therethrough and the inner periphery of the rivet would seat permanently in the circumferential groove 19. In Fig. 10 there is shown a split ring which snaps over the bevelled end 17a of the stud-like portion 17 when the same is forced therethrough into the hole 14 and recess 15 in the wing 6.

Figure 11:
Fig. 11 is a modified type of stud arrangement that may be used in my improved slider.

In Fig. 11 of the drawings, there is shown a modified construction of the cylindrical stud-like portion 17 of the wing 5. In this construction, there is provided a stud-like portion 17b having a pair of circumferential grooves arranged therearound which are spaced a very slight distance apart so as to provide an outer groove 20 and an inner groove 21. When the two wings are forced together, as above described, it will be seen that the resilient member 18 will snap first into the outer groove 20 to hold the two slider wings loosely together and in position ready to be assembled on the fastener elements and sufficiently spaced apart so as to permit the fastener elements to pass between the opposed flanges 7, whereby the slider can be positioned on the fastener elements for final assembly. After the wings have been assembled on the fastener elements as hereinbefore described, it will be understood that the two wings are forced together further so that the inner wall of the upper wing 5 will abut the outer end of the neck portion 12 of the lower wing 6. In moving the slider wings toward each other in such a manner, it will be seen that the resilient member 18 will be moved out of engagement with the outer circumferential groove 20 and into the inner circumferential groove 21 so as securely to attach the wings together. In other words, a double snapping action results with the outer circumferential groove 20 provided merely for the purpose of holding the complementary wings 5 and 6 together before assembly on the fastener, so as not to be displaced from each other until it is desired to assemble permanently the slider on the fastener elements.

As a result of my invention, it will be seen that there is provided a slider body consisting of two simple and inexpensive parts which can be readily assembled on the fastener elements even by the most unskilled person. In other words, it will be seen that there is provided a slider which can be assembled on the fastener elements by the amateur at home in case the fastener becomes damaged or the slider becomes displaced from the fastener, without the need of any tools whatsoever.

While I have shown and described one embodiment and several modifications which my invention may assume in practice, it will be understood that this embodiment and the modifications are merely for the purpose of illustration and description and that various other forms may be devised within the scope of my invention as defined in the appended claims.

What I claim as my invention is:

1. In a slider for slide fasteners of the class described, a pair of overlying parallel wings, means connecting said wings together in spaced relation so as to provide a fastener element receiving channel therebetween, comprising an inwardly projecting neck portion carried by one of said wings having a socket arranged therein, an inwardly projecting stud-like portion carried by the other of said wings conforming to and disposed in said socket, and means engaging the outer end of said stud-like portion for holding the same securely in said socket.

2. In a slider for slide fasteners of the class described, a pair of overlying parallel wings, means connecting said wings together in spaced relation so as to provide a fastener element receiving channel therebetween, comprising an inwardly projecting neck portion carried by one of said wings having a socket arranged therein, an inwardly projecting stud-like portion carried by the other of said wings conforming to and disposed in said socket, means engaging the outer end of said stud-like portion for holding the same securely in said socket, and means preventing rotation of said wings relative to each other about the axis of said stud-like portion and socket.

3. In a slider for slide fasteners of the class described, a pair of overlying parallel wings, means connecting said wings together in spaced relation so as to provide a fastener element receiving channel therebetween, comprising a male portion carried by one of said wings which is disposed in a female portion carried by the other of said wings, and an independent member carried by said female portion engaging said male portion automatically for connecting the wings securely together.

4. A slider for slide fasteners of the class described comprising a pair of spaced-apart parallel wings, means arranged at one end of said wings connecting the same together so as to provide a Y-shaped channel therebetween, said connecting means including an inwardly projecting stud-like portion carried by one of said wings, the other of said wings having a socket arranged therein conforming to and in which said stud-like portion is disposed, and an independent member arranged adjacent the bottom of said socket cooperating with the outer end of said stud-like portion for locking automatically the same therein whereby the wings are connected securely together.

5. A slider for slide fasteners of the class described comprising a pair of spaced parallel wings, means arranged at one end of said wings connecting the same together so as to provide a Y-shaped channel therebetween, said connecting means including an inwardly projecting stud-like portion carried by one of said wings, the other of said wings having a socket arranged therein conforming to and in which said stud-like portion is disposed, said stud-like portion having a groove arranged in the periphery thereof, and means lockingly engaging the groove of said stud-like portion whereby the wings are connected securely together.

6. A slider for slide fasteners of the class described comprising a pair of spaced-apart parallel wings, means arranged at one end of said wings connecting the same together so as to provide a Y-shaped channel therebetween, said connecting means including an inwardly projecting stud-like portion carried by one of said wings, the other of said wings having a socket arranged therein conforming to and in which said stud-like portion is disposed, and resilient means arranged adjacent the bottom of said socket engaging the outer end of said stud-like portion, said stud-like portion adapted to be forced into engagement with said resilient means so that said means is snapped into locked position on said stud-like member whereby the wings are connected securely together.

7. A slider for slide fasteners of the class described, as defined in claim 6, wherein the resilient means consists of a spring member which is adapted to engage a circumferential groove arranged around the stud-like portion adjacent the end thereof.

8. A slider for slide fasteners of the class described comprising a pair of spaced parallel wings, means arranged at one end of said wings connecting the same together so as to provide a Y-shaped channel therebetween, said connecting means including an inwardly projecting stud-like portion carried by one of said wings, the other of said wings having a socket arranged therein conforming to and in which said stud-like portion is disposed, said last mentioned wing having an opening arranged therein communicating with said socket adjacent the bottom thereof, and means arranged and confined in said opening and extending into said socket which engages lockingly said stud-like portion adjacent the outer end thereof for connecting the wings securely together.

9. A slider for slide fasteners of the class described comprising a pair of spaced parallel wings, means arranged at one end of said wings connecting the same together so as to provide a Y-shaped channel therebetween, said connecting means including an inwardly projecting stud-like portion carried by one of said wings, an inwardly projecting neck portion carried by the other of said wings, said neck portion being constructed and arranged so as to space the wings a predetermined distance apart and having a socket arranged therein centrally thereof conforming to and in which said stud-like portion of the opposed wing is disposed, and means arranged adjacent the bottom of said socket which engages lockingly said stud-like portion adjacent the outer end thereof for connecting the wings securely together.

10. A slider for slide fasteners of the class described comprising a pair of spaced parallel wings, means arranged at one end of said wing portions connecting the same together so as to provide a Y-shaped channel therebetween, said connecting means including an inwardly projecting stud-like portion carried by one of said wings, an inwardly projecting neck portion carried by the other of said wings, said neck portion having a socket arranged therein centrally thereof conforming to and in which said stud-like portion of the opposed wing is disposed, said last mentioned wing having an opening arranged therein communicating with said socket adjacent the bottom thereof and at a spaced distance from the outer side of said wing, and means arranged in said opening and extending into said socket which engages lockingly said stud-like member adjacent the outer end thereof for connecting the wings securely together.

11. A slider for slide fasteners of the class described comprising a pair of spaced parallel wings, means arranged at one end of said wings connecting the same together so as to provide a Y-shaped channel therebetween, said connecting means including an inwardly projecting stud-like portion carried by one of said wings, an inwardly projecting neck portion carried by the other of said wings, said neck portion having a socket arranged therein centrally conforming to and in which said stud-like portion of the opposed wing is disposed, said last mentioned wing having an opening arranged therein communicating with said socket adjacent the bottom thereof and at a spaced distance from the outer side of said wing, and a resilient member arranged and confined in said opening and extending into said socket which engages a circumferential groove arranged around the stud-like portion adjacent the outer end thereof, said stud-like portion adapted to be forced into engagement with said resilient member so that the same is snapped into position in said groove whereby the wings are connected securely together.

12. A slider for slide fasteners of the class described comprising a pair of spaced parallel wings, means arranged at one end of said wings connecting the same together so as to provide a Y-shaped channel therebetween, said connecting means including an inwardly projecting stud-like portion carried by one of said wings, a projecting neck portion carried by the other of said wings, said neck portion having a socket arranged therein centrally thereof conforming to and in which said stud-like portion of the opposed wing is disposed, said last mentioned wing having an opening arranged therein communicating with said socket intermediate the length of said neck portion, said opening having its longitudinal dimension extending substantially perpendicular to the longitudinal dimension of said socket and being open to the rear of the slider, and means arranged in said opening being inserted thereinto from the rear of the slider which lockingly engages the stud-like portion whereby the wings are connected securely together.

13. A slider for slide fasteners of the class described comprising a pair of spaced parallel wings, means arranged at one end of said wings connecting the same together so as to provide a Y-shaped channel therebetween, said connecting means including an inwardly projecting neck portion carried by one of said wings, said neck portion being constructed and arranged so as to space the wings a predetermined distance apart and having a polygonal-shaped socket arranged therein centraly thereof, a smaller inwardly projecting neck portion carried by the other of said wings having a polygonal-shaped cross-section conforming to the polygonal-shaped socket in said first mentioned neck portion in which it is disposed so as to prevent rotation of said wings relative to each other, and means retaining said last mentioned projecting neck portion in said socket whereby the wings are connected securely together.

14. A slider for slide fasteners of the class described comprising a pair of spaced parallel wings, means arranged at one end of said wings connecting the same together so as to provide a Y-shaped channel therebetween, said connecting means including an inwardly projecting neck portion carried by one of said wings, said neck portion being constructed and arranged so as to space the wings a predetermined distance apart and having a polygonal-shaped socket arranged therein centrally thereof, a smaller inwardly projecting neck portion carried by the other of said wings having a polygonal-shaped cross-section conforming to the polygonal-shaped socket in said first mentioned neck portion in which it is disposed so as to prevent rotation of said wings relative to each other, and yieldable engaging means arranged in said first mentioned wing adjacent the bottom of the socket therein which engages the outer end of the projecting neck portion of said last mentioned wing when the wings are forced together whereby the wings are connected securely together.

15. A slider for slide fasteners of the class described comprising a pair of spaced parallel wings, means arranged at one end of said wings connecting the same together so as to provide a Y-shaped channel therebetween, said connecting means including an inwardly projecting neck portion carried by one of said wings, said neck portion being constructed and arranged so as to space the wings a predetermined distance apart and having a polygonal-shaped socket arranged therein centrally thereof, a smaller inwardly projecting neck portion carried by the other of said wings having a polygonal-shaped cross-section conforming to the polygonal-shaped socket in said first mentioned neck portion in which it is disposed so as to prevent rotation of said wings relative to each other, a reduced stud-like portion arranged on the outer end of the projecting neck portion of said last mentioned wing which extends into an opening at the bottom of the socket in said first mentioned wing, and yieldable means arranged in said opening which engages a circumferential groove arranged around said stud-like portion when the wings are forced together whereby the wings are connected securely together.

16. A slider for slide fasteners of the class described, as defined in claim 15, wherein the yieldable means consists of a resilient spring member disposed in the opening in the first mentioned wing.

NOEL J. POUX.

REFERENCES CITED

The following references are of record in the file of this patent:

UNITED STATES PATENTS

| Number | Name | Date |
| --- | --- | --- |
| 2,082,988 | Taskila | June 8, 1937 |
| 2,095,932 | Kucera | Oct. 12, 1937 |
| 2,304,082 | Gerstman | Dec. 8, 1942 |

FOREIGN PATENTS

| Number | Country | Date |
| --- | --- | --- |
| 734,221 | France | July 26, 1932 |